United States Patent [19]
Graupner et al.

[11] Patent Number: 6,073,580
[45] Date of Patent: Jun. 13, 2000

[54] AUTOMATIC MILK SORTING DEVICE

[75] Inventors: Matthias Graupner, Leipzig; Jakob Maier, Tuerkheim, both of Germany

[73] Assignee: Siliconform GmbH & Co. KG, Tuerkheim, Germany

[21] Appl. No.: 09/043,775

[22] PCT Filed: Jul. 21, 1997

[86] PCT No.: PCT/EP97/03932

§ 371 Date: Dec. 28, 1998

§ 102(e) Date: Dec. 28, 1998

[87] PCT Pub. No.: WO98/04119

PCT Pub. Date: Feb. 5, 1998

[30] Foreign Application Priority Data

Jul. 25, 1996 [DE] Germany ............ 196 30 146

[51] Int. Cl.⁷ .................................................. A01J 5/007
[52] U.S. Cl. ............................................................. 119/14.08
[58] Field of Search ........................... 119/14.08, 14.14, 119/14.18, 14.54, 14.55

[56] References Cited

U.S. PATENT DOCUMENTS

| | | | |
|---|---|---|---|
| 2,898,549 | 5/1959 | Miller | 119/14.15 |
| 3,528,389 | 9/1970 | Floter | 119/14.55 |
| 4,344,385 | 8/1982 | Swanson et al. | 119/14.54 |
| 4,385,590 | 5/1983 | Mortenson | 119/14.54 |
| 5,664,521 | 9/1997 | Simpson et al. | 119/14.55 |
| 5,829,381 | 11/1998 | Nijkamp et al. | 119/14.54 |

FOREIGN PATENT DOCUMENTS

| | | |
|---|---|---|
| 0 054 915 | 6/1982 | European Pat. Off. . |
| 0 534 564 | 3/1993 | European Pat. Off. . |
| 19 49 559 | 4/1971 | Germany . |
| 27 59 126 | 7/1979 | Germany . |
| 961 609 | 10/1982 | Russian Federation . |
| WO94/08450 | 4/1994 | WIPO . |

Primary Examiner—Peter M. Poon
Assistant Examiner—Elizabeth Shaw
Attorney, Agent, or Firm—Flynn, Thiel, Boutell & Tanis, P.C.

[57] ABSTRACT

An automatic milk sorting device for use in machine milking, comprising a measurement device for measuring parameter values of the milk stream, a directional valve for directing the milk stream into various channels, and a control device for actuating the directional valve on the basis of the measured parameter values. According to the present invention, the directional valve comprises a housing provided with a milk inlet and a plurality of milk outlets, and a closure for selectively shutting off the milk outlets. The housing has arranged therein a measurement chamber which is in fluid communication with the interior of the housing via at least one opening and which is provided with a sensor for detecting parameter values. The structural design of a directional valve housing with an incorporated measurement chamber according to the present invention provides a compact, vacuum-tight construction and allows the device to be cleaned efficiently in a rinsing circuit.

32 Claims, 6 Drawing Sheets

AUTOMATIC MILK SORTING DEVICE

FIELD OF THE INVENTION

The present invention refers to an automatic milk sorting device for use in machine milking, and more particularly to a measurement device for determining parameter values of the milk stream, a directional valve means for selectively directing the milk stream into one of a plurality of channels, and a control means actuating said directional valve means so as to sort out milk on the basis of the determined parameter values.

BACKGROUND OF THE INVENTION

As is generally known, milk originating from a large number of animals flows into the collecting tank during machine milking. The resultant milk quality can be impaired strongly by milk originating from animals that are ill, especially from animals having an illness in an early stage which has not yet been diagnosed. For guaranteeing a high quality of the milk, it is therefore necessary to examine the milk during the milking operation and, if unsatisfactory quality is detected, to sort the milk out before it reaches the collecting tank.

Milk can be sorted out making use of the fact that the ion content of the milk of ill animals differs from that of the milk of animals that are not ill. Hence, the conductivity of milk can serve as a parameter on the basis of which milk of unsatisfactoy quality can be sorted out.

Known devices operating on the basis of conductivity measurements and used for separating the milk of ill animals are known from SU 961 609, DE 27 59 126 and WO 94/08450. According to the first-mentioned publication, the conductivity of milk is measured by means of two electrodes in the short milk hose between the teat cup and the collecting piece, and in said collecting piece the milk is separated into milk of satisfactory quality and mastitic milk. The flow conditions in the collecting piece are, however, of such a nature that, due to flow shade formation, only very inefficient cleaning by means of rinsing can be carried out. In addition, substantial vacuum losses will probably occur in the case of the embodiment shown so that this device is incable of fulfilling the requirements with regard to a stable vacuum on the teat. A collecting piece described in WO 94/08450 is subdivided into an upper and a lower chamber, the upper chamber being used for collecting the milk to be sorted out. Sensors for detecting parameters are provided on the inlet necks of the four short milk hoses between the teat cup and the collecting piece. Switching over is effected by means of valves rerouting the milk into the respective lower or upper chamber. Also in this device, problems will probably arise, when the device is being cleaned and disinfected in a rinsing circuit.

The use of the milking unit center as the location where the measurement is carried out is known from patent specification DE 1949559 among other publications. The center is subdivided into four chambers having installed therein the conductivity electrodes. Another embodiment is described in European patent EP 0054915. The center comprises four sub-chambers in which part of the milk of each quarter is collected and the conductivity is determined. For achieving an exchange of the milk in the chambers, outlet openings are provided in the base of the measurement chambers. This has the effect that part of the milk always flows from the measurement chamber back into the collecting piece. A varying milk stream may, however, result in a varying filling level in the measurement chamber, and this varying filling level causes unprecise measurements, especially in the case of low milk streams. When the outlet of the measurement chamber clogs, the milk in the measurement chamber will hardly be exchanged any more. All these conductivity sensors have in common that an electric line must be provided in the treading area of the animal, and this may result in an increased susceptibility to faults.

SUMMARY OF THE INVENTION

It is the object of the present invention to provide a new automatic milk sorting device of the type mentioned at the beginning, which, in comparison with conventional devices of this type, fulfills to a higher degree the milk quality assurance requirements.

The automatic milk sorting device according to the present invention by means of which this object is achieved is characterized in that the directional valve means comprises a housing provided with a milk inlet and a plurality of milk outlets, and a closure means for selectively shutting off the milk outlets, and that the housing has arranged therein a measurement chamber, which is in fluid communication with the interior of the housing via at least one opening and which is provided with a sensor means for detecting parameter values.

By arranging, in accordance with the present invention, a measurement chamber, which calms down the milk stream for measurement in a suitable manner, in the interior of a directional valve housing through which the milk flows, the measurement chamber can be cleaned efficiently in a rinsing circuit because an intensive rinsing flow is guaranteed especially by the reduction of the flow cross-section caused by the arrangement of the measurement chamber in the interior of the housing. In addition, the arrangement of the measurement chamber within the housing of the directional valve according to the present invention results in low vacuum losses and in a compact size on the basis of which the device can be arranged at any desired position between the teat cups and the collecting lines without disturbing the milking operation.

In a preferred embodiment of the present invention, also the closure means is movably arranged in the interior of the housing for selectively shutting off the milk outlets; this will result in a further reduction of the size and in an increase of the vacuum tightness.

A further advantageous embodiment of the present invention is so conceived that the closure means, which is preferably implemented as a shut-off slide member covering the milk outlets, is connected to a movable measurement chamber and that the shut-off slide member is adapted to be moved via the measurement chamber for selectively shutting off the milk outlets. Preferably, the measurement chamber is adapted to be rotated together with the closure means about an axis for selectively shutting off the milk outlets; in a preferably cylindrical embodiment of the directional valve housing, this axis is the cylinder axis. In the case of such an embodiment of the directional valve housing, the shut-off slide member, which is connected to the measurement chamber and which may be formed integrally with said measurement chamber, has, on the side facing the cylinder wall, a curvature corresponding to the curvature of said cylinder wall so that milk outlets provided in said cylinder wall can selectively be opened and closed by rotating the measurement chamber together with the shut-off slide member about the cylinder axis. This preferred embodiment permits a particularly compact structural design, and when the device is additionally so conceived that the measurement chamber and the shut-off slide member are adapted to rotate constantly about the cylinder axis during a rinsing operation, this movement of the measurement chamber will additionally increase the efficiency of the rinsing operation.

A further advantageous embodiment of the present invention is so conceived that the measurement chamber is constructed like a vessel which is open on one side thereof, the closure means being arranged on the bottom of said vessel; the opening of said vessel is directed substantially upwards at the various positions of the closure means. The vessel is, consequently, used as a collecting receptacle in which the flow of milk is suitably calmed down for measuring the parameters and is rendered bubble-free, which is a precondition for reproducible parameter measurements, in particular conductivity measurements.

A baffle plate provided with passages can be arranged above the opening of the vessel, said baffle plate controlling the flow of milk into the chamber and being advantageous especially in the case of embodiments where the milk inlet is arranged opposite the opening of the vessel at the shut-off positions of the measurement chamber.

According to a further advantageous embodiment of the present invention, the measurement chamber is provided with an opening sealed by a wall portion of the housing and dimensioned such that a sensor means provided on said housing wall portion and used for detecting the milk parameter values is in fluid communication with the measurement chamber at each shut-off position of said measurement chamber. By arranging the sensors e.g. in passages in the wall portion of the housing delimiting the measurement chamber at each shut-off position, this embodiment of the measurement chamber provided with an opening avoids in an advantageous manner the provision of sensor lines which extend from the movable measurement chamber and which, consequently, would have to be movable as well. Preferably, spring means are provided, which press the measurement chamber with the opening to be sealed against said housing wall portion.

According to a further preferred embodiment, the measurement chamber has provided therein at least one outlet opening so that the milk can be discharged from the measurement chamber at each shut-off position when the milk stream through the milk inlet ceases to flow or is below a predetermined threshold value. This measure is particularly advantageous in connection with an embodiment of the device which is so conceived that all the milk outlets are closed at one position of the shut-off slide member. At this position, a vacuum is no longer applied to the udder and the milking operation is finished. If the measurement chamber were still full when the milk stream has ceased to flow, it would be impossible to detect, on the basis of parameter values that are characteristic of the empty measurement chamber, the no longer existing milk stream and, consequently, the necessity of stopping the milking operation. If the milk can, however, flow off, it is possible to detect a characteristic parameter value, which indicates the necessity of stopping the milking operation, and to automatically discontinue, in response to this parameter value, the milking operation by closing all milk outlets.

The control means actuating the directional valve means so as to sort out milk on the basis of the detected parameter values comprises preferably a control computer, which is adapted to be used for complex data evaluation of measurement values and which compares measured parameter values, which have been detected by the measurement means, with. threshold values and produces signals for controlling the directional valve means so that the milk stream will flow off through a respective selected milk outlet.

When the conductivity of the milk is measured as a parameter, it will, in particular, be possible to carry out a temperature compensation via the control computer in an advantageous manner in that not only the conductivity but also the temperature of the milk are determined by means of a sensor in the measurement chamber and supplied to the computer. Via a stored conductivity/temperature function, a corrected value related to a normal temperature can then be determined on the basis of the conductivity value measured. When such temperature correction is carried out, it is no longer necessary to measure the conductivity close to the udder where the milk temperature is still comparatively constant and equal to the body temperature of the milked animal.

According to an advantageous embodiment of the present invention, the control computer can also be programmed such that, upon comparing detected parameters with threshold parameter values, it will take into account parameter time profiles over the milking period and determine correction values for the detected parameter value on the basis of respective stored functions. For example, the conductivity of the milk of ill animals depends on the respective milking stage (premilking, main milking, postmilking) so that, depending on the milking time that has already elapsed, the control computer will either change the threshold value, which is to be taken into account for actuating the directional valve, in accordance with the respective time function or correct the measured conductivity value in accordance with this time function.

According to an advantageous embodiment, the control computer may also have stored therein parameter values which serve as a standard and which are determined e.g. during a rinsing operation when a specific rinsing period has elapsed, said parameter values being e.g. representative of the pure rinsing agent filling the measurement chamber. For determining such a standard value, in particular a standard conductivity value, it is also possible to provide a standard measuring cell, which consists especially of a measurement chamber imitating the measurement geometry of the measurement chamber in the directional valve means, at a suitable point of the line system where the flow has been calmed down. Conductivity measurements require constant calibration of the device because the electrodes used for the measurements are subjected to a comparatively high wear.

According to a further advantageous embodiment of the present invention, the control computer can also be programmed in such a way that it takes into account parameter values of preceding milking cycles. If, for example, the milk of one animal has been sorted out completely because of unsatisfactory quality, the control computer can be programmed such that, in a milking cycle following immediately afterwards, the milk will first be sorted out via the control computer, independently of the milk quality, for a predetermined period of time until the measurement chamber has been rinsed to such an extent that reliable values which are not influenced by the preceding milking cycle are obtained.

According to a further advantageous embodiment of the present invention, the directional valve means and the measurement means for detecting parameter values of the conductivity of the milk stream are provided for each teat. A separate supervision of the milk from each teat is expedient, since, in the case of diseases of the udder, only the quality of the milk of individual teats may be impaired.

A detection of milk conductivity for the purpose of sorting out milk can serve the additional purpose of a general health supervision of the animals due to the fact that, on the basis of the sorting out of milk as such and on the basis of analyses of the sorted-out milk, diseases can be diagnosed, especially the subclinical prestages of such diseases in which the already existing disease cannot yet be detected from externally visible changes.

In addition to the aspect of sorting out milk of inferior quality, the present invention can also be used simply for the purpose of separating different milk qualities, which are, however, usable in any case. In this connection, it is e.g. imaginable to measure the protein, fat and lactose content as a parameter, the control computer controlling then the directional valve means via respective suitable threshold values so as to associate a specific milk quality with one of the milk outlets provided in accordance with the number of quality classes.

When the fat content of the milk is constant from one animal to the next, such a separation of the milk according to its fat content could, however, also be carried out without any measurement of parameters, simply on the basis of a dependence of the fat content on the milking time, said dependence being stored in the control computer; in this case, a respective different milk outlet is selected at instances stored in the control computer after specific milking times.

Especially in combination with a milk flowmeter, the device according to the present invention could also be used in an advantageous manner for controlling the vacuum applied to the udder, and, in particular, for keeping said vacuum constant. Such keeping constant of the vacuum would be possible on the basis of the fact that a milk outlet which has been selected for discharging the milk is still covered partially by the shut-off slide member and that the vacuum applied to the teat is controlled via the degree of partial covering. This measure could especially delay the "climbing" of the teat cup, which occurs when the vacuum is excessively high and as a result of which the upper rim of the teat cup presses against the udder.

Finally, the control computer can also process animal-related data, e.g. of a herd management system, for controlling the directional valve means, and cause in this way a separation of the milk of specific animals independently of parameter values.

Further advantageous possible embodiments are disclosed by the subclaims.

BRIEF DESCRIPTION OF THE DRAWINGS

The present invention will now be explained and described in detail on the basis of embodiments and on the basis of the drawings enclosed which refer to these embodiments and in which.

DETAILED DESCRIPTION

Figure 8:
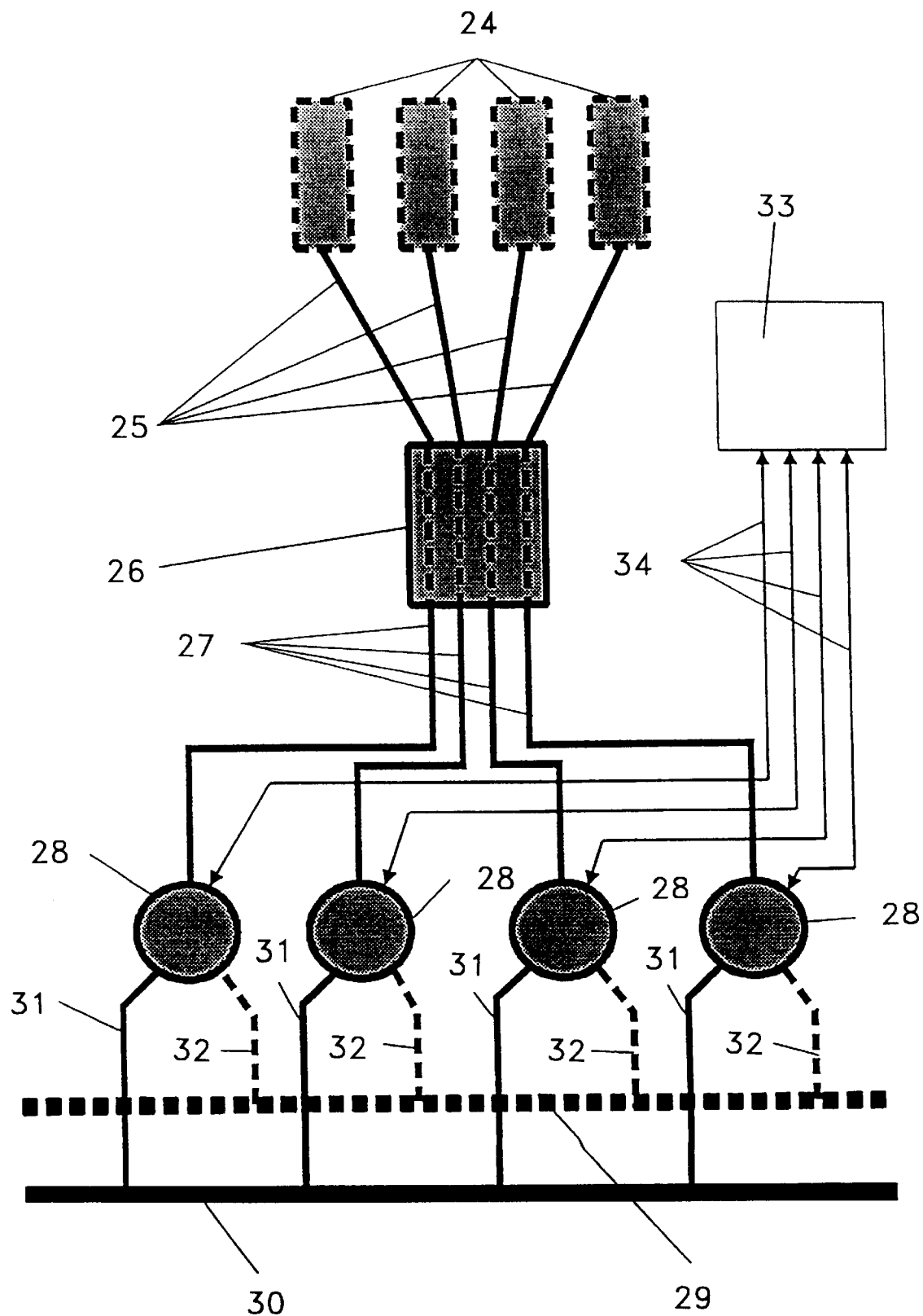
FIG. 8 shows (schematically) a milking means with four teat cups and with four directional valve means according to the present invention, said directional valve means being associated with these teat cups and receiving milk from the respective teat cup.

To begin with, reference is made to the schematic representation according to FIG. 8 where four teat cups for the four teats of an udder are designated by reference numeral 24. Each teat cup is connected to a short milk hose 25, said hoses 25 leading to a quarter center 26. According to each short hose 25, a long hose 27 extends from said quarter center. The respective directional valve means 28 are followed by branch lines 31 and 32; branch lines 31 end in a collecting line system 30 and lines 32 end in a collecting line system 29 which is separate from said collecting line system 30.

Reference numeral 33 designates in FIG. 8 a control means which comprises a control computer and which is connected to each directional valve means 28 via respective line connections 34.

As will be explained hereinbelow, each of said directional valve means 28 comprises a measurement chamber with electrodes for measuring the conductivity of the milk as well as a temperature sensor for determining the temperature of the milk. Each of said directional valve means 28 additionally comprises an adjusting device, preferably a stepping motor (not shown), for changing the directional valve over between the branch lines 31 and 32. Each of the connections 34 comprises a plurality of connecting lines to the electrodes, the temperature sensor and the adjusting device, said connecting lines supplying signals from said electrodes an said temperature sensor to the control means 33, whereas the control means 33 transmits respective control signals via the connecting lines connected to the adjusting devices.

During milking, the control means 33 determines via the electrodes the conductivity of the milk in the measurement chamber of each directional valve means and compares the conductivity values determined with predetermined threshold values representative of the boundary between usable milk and milk that has to be sorted out. When such a threshold value is exceeded, the respective directional valve means is switched over between the branch lines 31 and 32 so that e.g. milk to be sorted out will flow into the collecting line system 29 and usable milk into the collecting line system 30.

By means of the temperature sensor, the temperature is additionally determined and, via a conductivity-temperature function stored in the control computer of the control means 33, the control computer either corrects the measured conductivity value or changes the threshold value underlying the signal generation for the control of the directional valve means.

Figure 2:
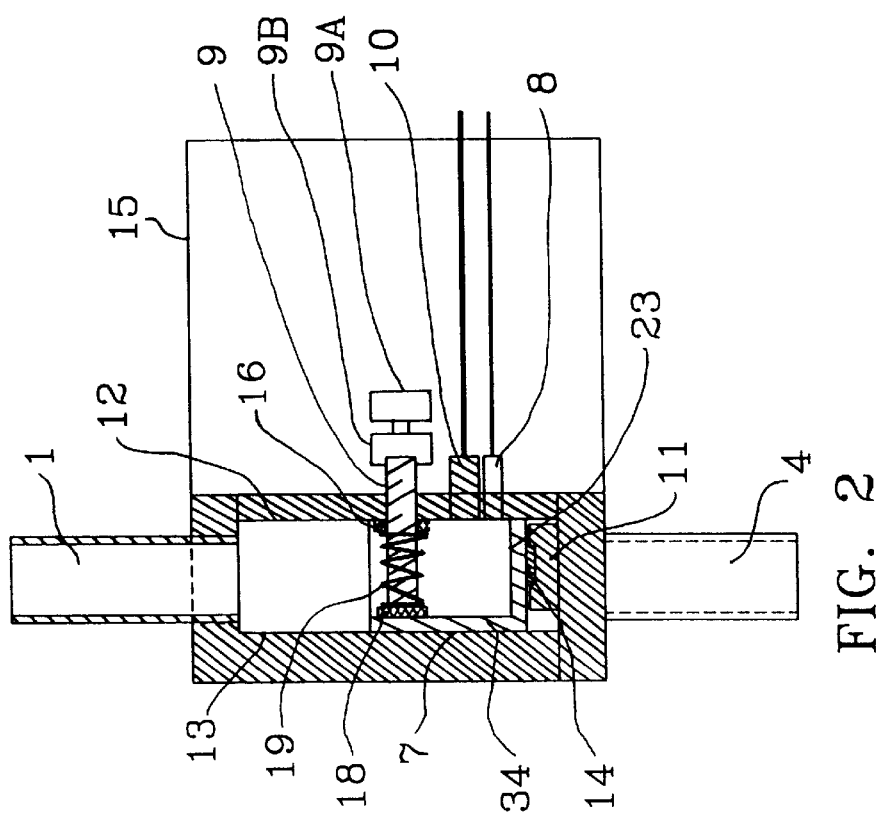
FIG. 2 shows the directional valve means of FIG. 1 in a sectional side view.
Figure 1:
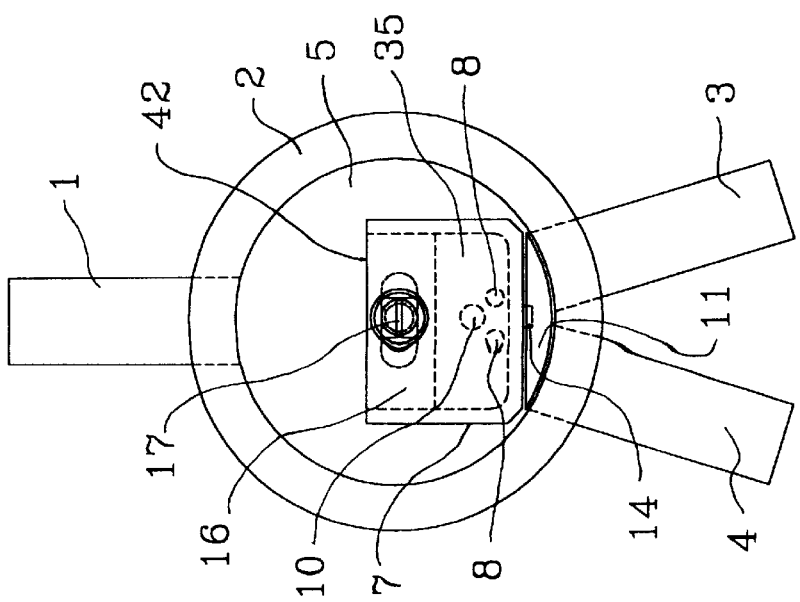
FIG. 1 shows a directional valve means with a measurement chamber according to the present invention.

Reference is now made to FIG. 1 and 2 where an embodiment of a directional valve means is shown, which comprises a measurement chamber and which is adapted to be used in the device according to FIG. 8.

Reference numeral 1 in FIGS. 1 and 2 designates an inlet neck which opens into a valve housing 5 defined by a cylindrical ring member 2 and by covers 12 and 13 positioned on the end faces of said ring member. Outlet necks 3 and 4 are connected to the ring member 2 approximately diametrically to the inlet neck 1. In order to avoid vacuum losses, the cross-section of the outlet necks can, other than in the case of the embodiment shown, be larger than the cross-section of the inlet neck. In the embodiment shown, the end-face cover 13 consists of a transparent material, in particular of transparent plastic material, so that the milk passing through and the change-over processes in the directional valve means can be observed from outside.

The housing 5 has arranged therein a measurement chamber 7 in the form of a vessel which is open on one side thereof, said measurement chamber 7 being adapted to be rotated via a drive shaft 9 extending through the end-face cover 12. The drive shaft 9 extends through an opening in a wall member 16 of the measurement chamber and engages by means of a transverse web 17 provided on the end face thereof a complementary recess in a wall member 34 of the measurement chamber 7 located opposite said wall member 16. An annular stop 18 is provided on said drive shaft 9; one end of a helical spring 19, which is arranged on said drive shaft 9, rests on said annular stop 18, the other end of said helical spring 19 pressing against the wall member 16, i.e. it presses the measurement chamber against the end-face cover 12.

Unlike the wall member 34 of the measurement chamber 7 facing the transparent end-face cover 13, the wall member 16 is not a continuous component so that an opening 35 is defined on the side of the measurement chamber 7 facing the end-face cover 12.

Reference numeral 8 designates in FIGS. 1 and 2 electrodes used for measuring the conductivity; said electrodes are conducted through a lead-through in the end-face cover 12 and their ends are flush with the inner surface of the end-face cover 12. Close to the electrodes 8, a temperature sensor 10 is additionally provided in said end-face cover 12; like the electrodes, said temperature sensor 10 does not project beyond the inner surface of the end-face cover 12.

A bottom wall of the measurement chamber 7 is connected via a pin 14 to a shut-off slide member 11 which is adapted to the curvature of the ring member 2 of the housing 5. In the embodiment shown, the shut-off slide member is dimensioned such that, at the position shown in FIG. 1, it shuts off both outlet necks 3 and 4 simultaneously. Due to this shut-off possibility, no further vacuum sealing is required in the milk lines.

Reference numeral 15 designates in FIG. 2 a schematically outlined housing chamber which borders on the housing 5 and which accommodates a stepping motor 9A connected to the drive shaft 9 via a transmission 9B.

In the operative condition, when milk is passing through, the measurement chamber 7 together with the shut-off slide member 11 attached thereto occupy one of the positions explained on the basis of FIG. 5 at which either the outlet neck 4 or the outlet neck 3 is shut off. While the milk is passing through, a constantly exchanged part of the milk flows into the measurement chamber implemented as a vessel which is open on one side thereof, the amount of milk exchanged in the measurement chamber being so small that the flow of milk calms down in said measurement chamber and that, in particular, a substantially bubble-free milk volume is obtained which is adapted to be used for reproducible conductivity measurements via the electrodes 8. The opening 35 in the measurement chamber 7 is dimensioned such that the electrodes 8 used for measuring the conductivity as well as the temperature sensor 10 are in fluid communication with the milk in the measurement chamber at each shut-off position of the measurement chamber. By means of the spring 19, the measurement chamber is pressed against the end-face cover 12 so that the edge of the opening 35 is sufficiently sealed from the interior of the housing 5.

As has already been described with reference to FIG. 8, the control means 33 transmits a control signal to the stepping motor, which is not shown in FIG. 2, when a detected conductivity value, which may have been corrected via a temperature measurement, exceeds a predetermined threshold value; the stepping motor then rotates the measurement chamber from one of the shut-off positions explained on the basis of FIG. 5 to the next. This has the effect that the milk supplied is discharged either through the outlet neck 3 or through the outlet neck 4 and sorted accordingly.

When the milk stream ceases to flow, which is detected by an additionally installed flowmeter (not shown), the control means 33 supplies a signal for rotation of the measurement chamber to the position shown in FIG. 1; at this position, both outlet necks are shut off and the teat cup in question is therefore separated from the milking vacuum.

During a rinsing process, the stepping motor (not shown) can be controlled by the control means 33 in such a way that the measurement chamber constantly carries out complete rotations, whereby the outlet neck 3 and the outlet neck 4 are opened for cleaning in turn. By means of this rotation, it is especially possible to achieve an even more efficient cleaning of the measurement chamber in that the flow of rinsing agent entering the measurement chamber impinges on different wall portions of the measurement chamber at different times. In addition, a further rinsing effect is achieved by the rotation of the measurement chamber and the resultant relative movement taking place between the chamber walls and the rinsing agent.

Figure 4:
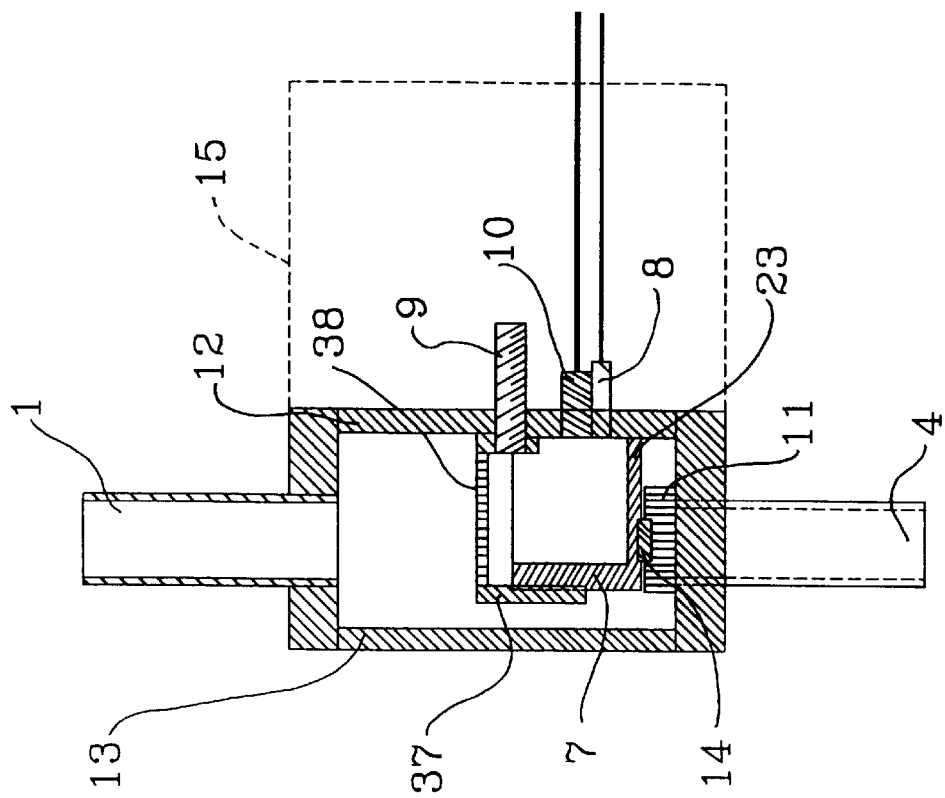
FIG. 4 shows a sectional side view of the directional valve means of FIG. 3, FIG. 5A and 5B show the directional valve means of FIG. 3 with different positions of the measurement chamber.
Figure 3:
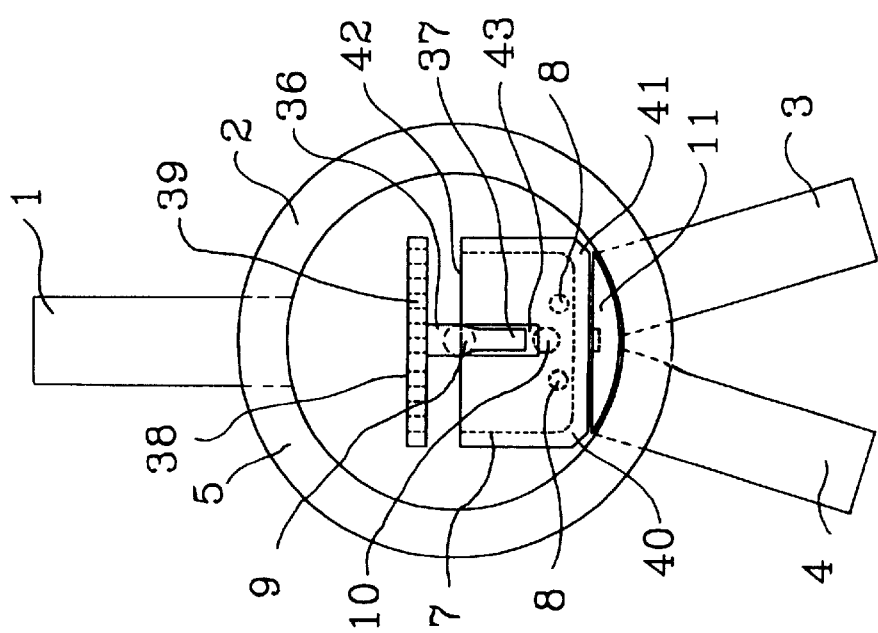
FIG. 3 shows a front view of a further embodiment of a directional valve means with a measurement chamber according to the present invention.

Reference is now made to FIGS. 3 to 5 where a further embodiment of a directional valve means including a measurement chamber is shown and where identical parts or parts producing the same effect are designated by the same reference numeral which has also been used in the preceding FIGS. 1 and 2.

The embodiment according to FIGS. 3 to 5 differs from the preceding embodiment insofar as the drive shaft 9 does not extend through an opening in the measurement chamber wall, but is connected to a spring brace 36 including a spring member 37 which abuts on the wall 34 of the measurement chamber 7. The spring member 37 guided in a groove 43 of the chamber wall member 34 presses the measurement chamber, which is in this case implemented such that it does not include the chamber wall member 16, against the end-face cover 12 so as to seal it. The freedom of movement of the measurement chamber is limited upwards by the spring member 37 abutting on the lower boundary of the groove 43 and down-wards by the shut-off slide member 11 abutting on the wall of the housing 5. The spring brace 36 is additionally provided with a baffle surface 38 with passages 39, which is arranged above the opening 42 of the measurement chamber 7 and by means of which it can be regulated what percentage of the milk stream entering the housing 5 via the inlet neck 1 reaches the measurement chamber 7.

Figure 5B:
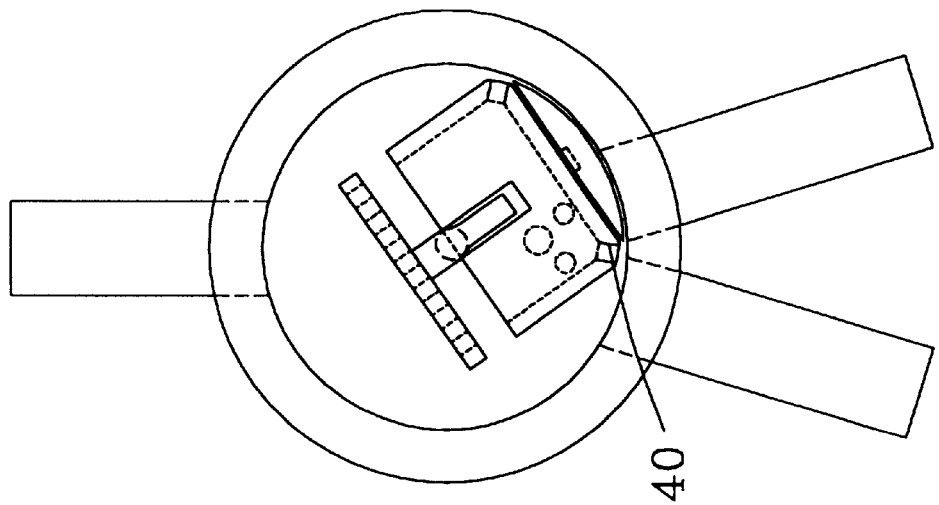
Figure 5A:
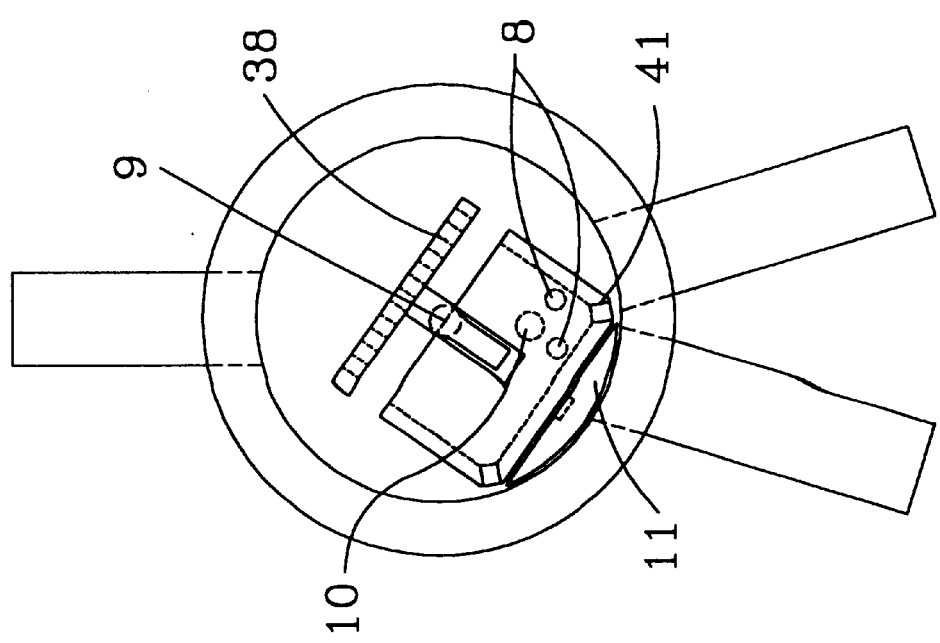

A further difference in comparison with the device described on the basis of FIGS. 1 and 2 is to be seen in that the measurement chamber 7 is provided with outlet openings 40 and 41; when the milk stream supplied through the inlet neck 1 ceases to flow, the outlet opening 41 will guarantee complete emptying of the measurement chamber at the shut-off position of the measurement chamber shown in FIG. 5a, whereas at the shut-off position shown in FIG. 5b the outlet opening 40 will produce this effect. When the milk stream ceases to flow or when the flow of said milk stream decreases to values below a predetermined threshold value, said outlet openings 40 and 41 will guarantee that the measurement chamber can empty and that a conductivity value which is characteristic of an empty measurement chamber can be measured. In the embodiment shown, the control computer of the control means 33 is programmed such that it supplies a control signal on the basis of this characteristic conductivity value; by means of this control signal, the measurement chamber 7 is rotated to the shut-off position for both outlet necks shown in FIG. 4, whereby the milking vacuum will be separated from the teats and the milking operation will be finished. It follows that the outlet openings 40 and 41 guarantee that, when the milk stream ceases to flow, a signal stopping the milking operation can be derived, whereby the milking operation can be discontinued automatically at the necessary moment.

In the embodiment shown in FIGS. 1 and 2, which does not include these outlet openings, the flowmeter indicating the milk stream is additionally required for guaranteeing the above-mentioned function, the control means 33 deriving an appropriate shut-off signal from the signal of this flowmeter.

Figure 6:
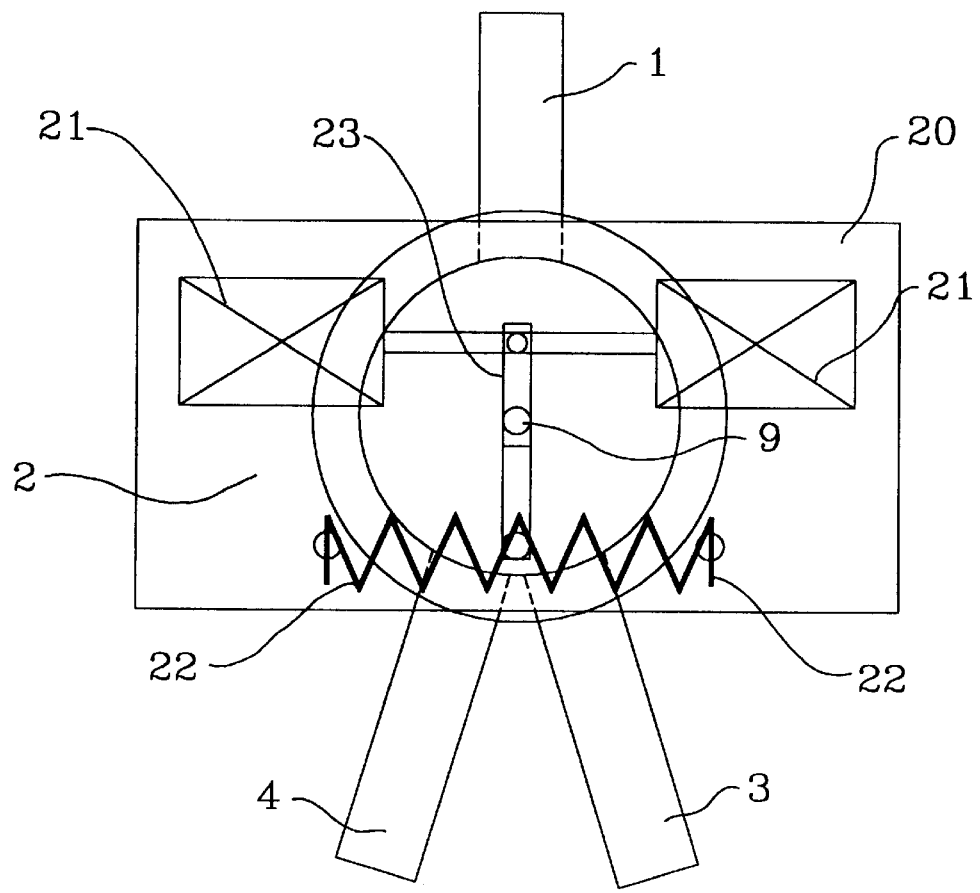
FIG. 6 shows a further embodiment of a directional valve means according to the present invention with an electromagnet rotary drive for the measurement chamber.

In the case of the additional embodiment of a directional valve means including a measurement chamber, which is shown in FIG. 6, parts corresponding to those of preceding embodiments are designated by the same reference numeral.

In this embodiment, two electromagnets 21 are provided for rotating the drive shaft 9, said electromagnets moving the end of a two-sided lever whose middle is connected to the drive shaft 9. The other end of the two-sided lever is connected to a resetting helical spring 22 producing a resetting force; this lever end acts on the middle of the helical spring 22, which is fastened at the ends thereof, so that a resetting force to the position at which both outlet necks 3 and 4 are shut off exists at both switching positions of the electromagnets.

Figure 7:
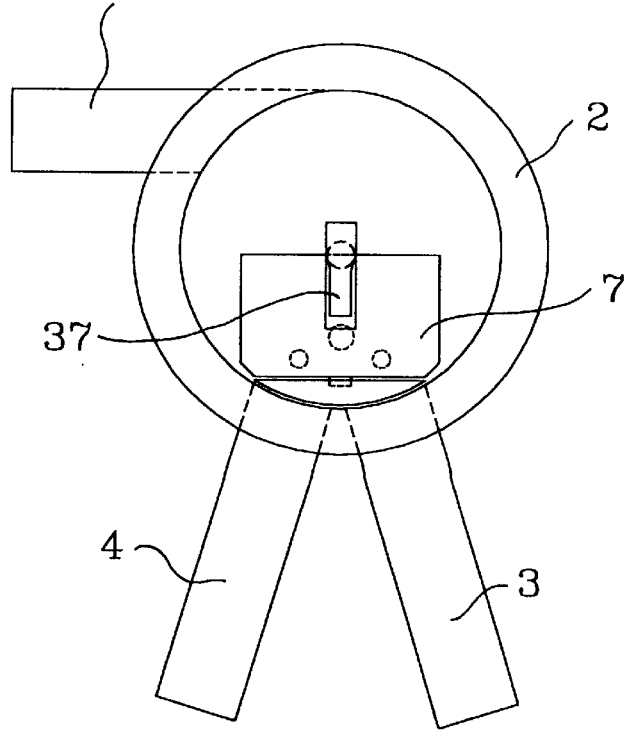
FIG. 7 shows a further embodiment of a directional valve means with an arrangement of a milk inlet neck which has been changed in comparison with the arrangement of the preceding embodiments.

The embodiment shown in FIG. 7, where parts corresponding to those of preceding embodiments are designated by the same reference numerals, differs from the preceding embodiments insofar as the inlet neck is not arranged diametrically to the outlet necks, but at a position at which the milk stream enters the housing essentially at right angles to the direction in which it enters said housing in the case of the diametrical arrangement. In contrast to the embodiment according to FIGS. 3 to 5, the embodiment according to FIG. 7 does not include a baffle plate, since, due to the direction in which the milk stream enters the housing, it is automatically guaranteed that only a desired small percentage of the milk supplied will flow directly into the measurement chamber.

Figure 9A:
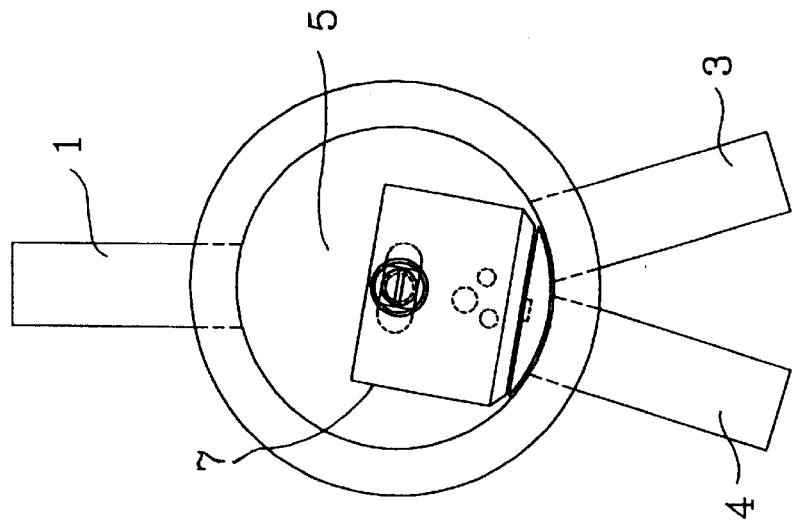
FIGS. 9A, 9B and 9C show the directional valve means of FIG. 1 at various positions of the measurement chamber, the milk outlet selected for discharging the milk being partially covered.
Figure 9B:
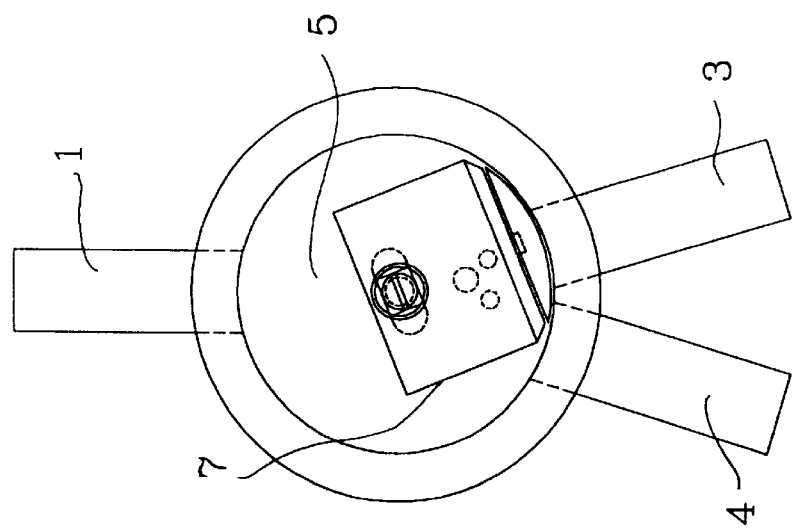
Figure 9C:
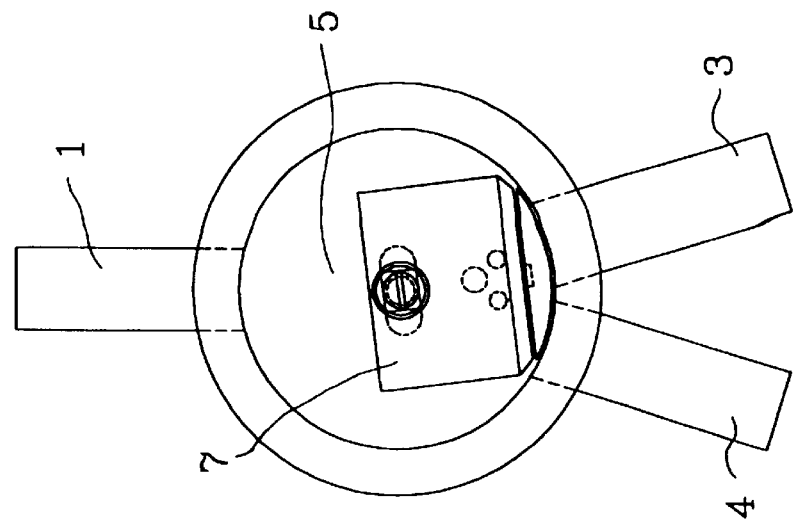

Reference is now made to FIGS. 9A–C where the the directional valve means of FIG. 1 is shown at positions of the measurement chamber at which a respective milk outlet chosen for discharging the milk is only partially open. Via the degree of opening and a resultant control of the flow cross-section, the partial vacuum applied to the udder can be controlled and especially kept constant. By means of this control, it is possible to delay the so-called "climbing" of the teat cup in the course of which the teat cup attached to the teat under a partial vacuum migrates gradually upwards until the edge of its opening abuts on the udder, whereby the milking operation will be impaired. In FIGS. 9A and B, the outlet 4 chosen for discharging the milk is partly closed, whereas in FIG. 9C it is the milk outlet 3 that is partially closed. The partial-vacuum value, which is determined via a pressure sensor (not shown) on the udder, can be supplied to the control means 33 which will then influence the position of the measurement chamber according to a control circuit in such a way that a specific partial-vacuum target value is achieved.

We claim:

1. An automatic milk sorting device for use in a milking machine, comprising:

directional valve means for selectively directing a milk stream into one of a plurality of channels, the directional valve means including a housing provided with a milk inlet, a plurality of milk outlets respectively open to said plurality of channels, and closure means for selectively shutting off the milk outlets, said closure means being shiftable between a first position shutting off a first said milk outlet connected to one of said channels that receives useable milk and a second position shutting off a second said milk outlet connected to a second of said channels that receives unsatisfactory milk, the housing including therein a measurement chamber in fluid communication with the interior of the housing via at least one opening, and said measurement chamber including sensor means for detecting parameter values of the milk, and control means connected to said sensor means for receiving the detected parameter value and to said closure means, wherein said control means, based on the received detected parameter value, selectively positions said closure means so that said closure means shuts off at least one of the first milk outlet or the second milk outlet.

2. A device according to claim 1, wherein said closure means is arranged in the interior of the housing and is adapted to be moved so as to selectively shut off the milk outlets.

3. A device according to claim 2, wherein the measurement chamber is connected to said closure means and is adapted to be moved together with said closure means for selectively closing the milk outlets, and the closure means is adapted to be moved by the measurement chamber.

4. A device according to claim 3, wherein the closure means is formed integrally with the measurement chamber.

5. A device according to claim 1, wherein the closure means is a shut-off slide member covering the milk outlets.

6. A device according to claim 1, wherein the measurement chamber is a vessel which has an opening on one end thereof, the closure means being arranged on the bottom of said vessel.

7. A device according to claim 6, wherein the opening of the vessel is arranged essentially opposite the milk inlet at all shut-off positions of the closure means.

8. A device according to claim 1, wherein the measurement chamber includes a sensor opening sealed by a wall portion of the housing and dimensioned such that at least one said sensor means provided on said housing wall portion and used for detecting the milk parameters is in fluid communication with the measurement chamber at each shut-off position of the closure means through said sensor opening.

9. A device according to claim 8, wherein spring means are provided with the aid of which the measurement chamber is pressed against said wall portion of said housing for the purpose of sealing said sensor opening.

10. A device according to claim 1, wherein the measurement chamber includes at least one outlet opening which empties the measurement chamber in at least one shut-off position of the closure means, when the milk stream flowing in through the milk inlet decreases to a value below a predetermined minimum value.

11. A device according to claim 1, wherein the housing has a round cylindrical shape.

12. A device according to claim 11, wherein the housing includes a drive shaft for rotating the measurement chamber which extends through at least one end wall of the round cylindrical housing.

13. A device according to claim 11, wherein the milk inlet and milk outlets are provided in a cylindrical wall of the round cylindrical housing, and the milk outlets are arranged in approximately diametrically opposed relationship with the milk inlet.

14. A device according to claim 1, wherein the housing includes a transparent wall member.

15. A device according to claim 1, wherein at a third position of the closure means all the milk outlets are shut off.

16. A device according to claim 1, wherein the sensor means comprises electrodes for detecting the conductivity of the milk.

17. A device according to claim 1, wherein the sensor means comprises a temperature sensor for detecting the milk temperature.

18. A device according to claim 1, wherein the control means comprises a control computer.

19. A device according to claim 18, wherein the control computer is programmed for controlling the directional valve means on the basis of a comparison of detected parameter values with predetermined parameter threshold values.

20. A device according to claim 18, wherein the control computer is programmed for correcting the detected parameter values or for adapting the parameter threshold values on the basis of stored parameter value/time profiles related to the period of milking.

21. A device according to claim 1, wherein the values that are detected as parameters are at least one of the conductivity of the milk, the protein content of the milk, the fat content of the milk, the urea content, the content of various enzymes and inhibitors and the lactose content.

22. A device according to claim 1, wherein, for temperature-depending correction of detected milk conductivity values, the control computer is programmed based on one of additionally measured milk temperature values and a stored temperature/time profile related to the period of milking.

23. A device according to claim 1, wherein, for correcting the measured milk conductivity, the control computer is programmed on the basis of a normal conductivity value for rinsing agent measured during a rinsing process.

24. A device according to claim 1, wherein separate directional valve means are provided for each teat of a plurality of teats.

25. A device according to claim 1, wherein a partial vacuum applied to the udder is adapted to be controlled by partially closing the milk outlet provided for discharging the milk.

26. A automatic milk sorting device for use in a milking machine, comprising:

a directional valve for selectively directing a milk stream into one of a plurality of channels, said directional valve including a housing provided with a milk inlet, a plurality of milk outlets, and a closure means for selectively shutting off said milk outlets, said housing including therein a measurement chamber which is in fluid communication with the interior of the housing via at least one opening, the measurement chamber being adapted to be rotated together with the closure means about a shaft for selectively shutting off the milk outlets, said measurement chamber including a sensor for detecting parameter values of the milk, and control means acting on said directional valve so as to sort out milk based on the determined parameter values.

27. A device according to claim 26, wherein the measurement chamber is adapted to rotate constantly about the shaft during a rinsing process.

28. A device according to claim 26, wherein the measurement chamber rotates about the cylinder axis of the housing.

29. A device according to claim 26, wherein the measurement chamber is adapted to be rotated by means of a stepping motor or by means of at least one electromagnet rotating the drive shaft via a lever.

30. An automatic milk sorting device for use in a milking machine, comprising:

a directional valve for selectively directing a milk stream into one of a plurality of channels, said directional valve including a housing provided with a milk inlet, a plurality of milk outlets, and closure means for selectively shutting off said milk outlets, said closure means including a shut-off slide member covering said milk outlets, a shut-off surface of the shut-off slide member facing the milk outlets having the same radius of curvature as a wall portion including said milk outlets of said housing so that said milk outlets can selectively be shut off by rotating the shut-off slide member about an axis of rotation extending through the axis of said curvature, said measurement chamber including a sensor for detecting parameter values of the milk, and control means acting on said directional valve so as to sort out milk based on the determined parameter values.

31. An automatic milk sorting device for use in a milking machine, comprising:

a directional valve for selectively directing a milk stream into one of a plurality of channels, said directional valve including a housing provided with a milk inlet, a plurality of milk outlets, and a closure means for selectively shutting off said milk outlets, said housing including therein a measurement chamber, which is in fluid communication with the interior of the housing via at least one opening, said measurement chamber including a sensor for detecting parameter values of the milk, a baffle plate including passages therethrough arranged above the opening of the vessel so as to control the milk stream which flows from the milk inlet directly into the measurement chamber, control means acting on said directional valve so as to sort out milk based on the determined parameter values.

32. A directional valve, comprising:

a housing provided with a milk inlet, a plurality of milk outlets, and a closure means for selectively shutting off the milk outlets, said closure means being shiftable between a first position shutting off a first of said milk outlets connected to a useable milk said channel and a second position shutting off a second of said milk outlets connected to an unsatisfactory milk said channel, the housing including therein a measurement chamber in fluid communication with the interior of the housing via at least one opening, the measurement chamber including sensor means for detecting milk parameter values.

* * * * *